United States Patent
Bengtsson et al.

(10) Patent No.: US 9,842,329 B2
(45) Date of Patent: Dec. 12, 2017

(54) BODY AREA NETWORK FOR SECURE PAYMENT

(71) Applicant: SONY MOBILE COMMUNICATIONS INC., Tokyo (JP)

(72) Inventors: Henrik Bengtsson, Lund (SE); Stefan Andersson, Klagerup (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 157 days.

(21) Appl. No.: 14/621,789

(22) Filed: Feb. 13, 2015

(65) Prior Publication Data

US 2016/0239823 A1 Aug. 18, 2016

(51) Int. Cl.
*G06Q 20/32* (2012.01)
*G06F 1/16* (2006.01)
(Continued)

(52) U.S. Cl.
CPC ........... *G06Q 20/327* (2013.01); *G06F 1/163* (2013.01); *G06Q 20/3226* (2013.01);
(Continued)

(58) Field of Classification Search
CPC .... A61B 3/11; A61B 5/00; A61B 5/02; A61B 5/021; A61B 5/024; A61B 5/026;
(Continued)

(56) References Cited

U.S. PATENT DOCUMENTS 6,211,799 B1  4/2001 Post et al.
6,580,356 B1  6/2003 Alt et al.
(Continued)

FOREIGN PATENT DOCUMENTS

EP  1024626 A1  8/2000
EP  1102215 A2  5/2001
(Continued)

OTHER PUBLICATIONS

Zimmerman, "Personal Area Networks: Near-Field intrabody communication," XP 000635090 IBM Systems Journal, vol. 35, Nos. 3&4, 1996, pp. 609-617.
(Continued)

*Primary Examiner* — Mohammad A Nilforoush
*Assistant Examiner* — Wodajo Getachew
(74) *Attorney, Agent, or Firm* — Tucker Ellis LLP; Ross Kowalski

(57) ABSTRACT

Disclosed is a method performed in a system comprising a first Body Area Network (BAN) enabled device and a second BAN enabled device, for performing secure payment at a payment counter by a user of the first and the second BAN enabled devices, the user wearing or carrying the first and the second BAN enabled devices; where the first and the second BAN enabled devices are paired for authorizing the user by the second BAN enabled device; the method comprises: establishing a connection between the payment counter and the first BAN enabled device; sending a BAN signal via BAN from the first BAN enabled device to the second BAN enabled device requiring confirmation from the second BAN enabled device that the second BAN enabled device is in contact with the user's body; receiving a confirmation BAN signal via BAN from the second BAN enabled device to the first BAN enabled device confirming that the second BAN enabled device is in contact with the user's body; receiving a request for payment from the payment counter in the first and/or second BAN enabled device; and confirming the requested payment in the first and/or second BAN enabled device.

12 Claims, 11 Drawing Sheets

(51) Int. Cl.
| | |
|---|---|
| *G06Q 20/38* | (2012.01) |
| *G06Q 20/40* | (2012.01) |
| *G06Q 20/42* | (2012.01) |
| *H04B 13/00* | (2006.01) |
| *H04L 29/06* | (2006.01) |
| *H04W 12/06* | (2009.01) |
| *H04W 84/12* | (2009.01) |

(52) U.S. Cl.
CPC ......... *G06Q 20/382* (2013.01); *G06Q 20/405* (2013.01); *G06Q 20/40145* (2013.01); *G06Q 20/42* (2013.01); *H04B 13/005* (2013.01); *H04L 63/08* (2013.01); *H04W 12/06* (2013.01); *G06Q 20/3278* (2013.01); *H04W 84/12* (2013.01)

(58) Field of Classification Search
CPC ....... A61B 5/0205; A61B 5/0295; A61B 5/03; A61B 5/0402; A61B 5/0476; A61B 5/053; A61B 5/08; A61B 5/083; A61B 5/103; A61B 5/11; A61B 5/117; A61B 5/145; A61B 5/1455; A61B 5/1477; A61B 5/16; A61B 7/04; A61B 8/08; G08B 3/00; G08B 5/22; G08B 5/36; G08B 6/00; G08B 12/04; G08B 21/02; G08B 21/04; G08B 21/18; G08B 13/00–13/26; G06F 1/00–1/3296; G06F 3/01; G06F 3/041; G06F 3/0484; G06F 3/14; G06F 11/30; G06F 17/21; G06F 17/22; G06F 17/30; G06F 19/00; G06F 19/12; G06F 19/14; G06F 19/22; G06F 19/24; G06F 19/28; G06F 21/31; G06F 21/32; G06F 21/34; G06F 21/36; G06F 21/62; G06Q 20/00–20/426; H04L 9/30; H04L 9/32; H04W 4/00; H04W 4/02; H04W 4/16; H04W 64/00
USPC ....................................... 705/65, 44, 14, 2, 26
See application file for complete search history.

(56) References Cited

U.S. PATENT DOCUMENTS

| | | | |
|---|---|---|---|
| 7,202,773 B1 | 4/2007 | Oba et al. | |
| 8,823,494 B1* | 9/2014 | Kovitz | H01Q 1/2225 340/10.1 |
| 8,867,995 B2 | 10/2014 | Kim et al. | |
| 9,398,007 B1* | 7/2016 | Wegener | H04L 63/0861 |
| 2002/0128030 A1 | 9/2002 | Eiden et al. | |
| 2004/0203381 A1 | 10/2004 | Cahn et al. | |
| 2004/0248513 A1 | 12/2004 | Glass et al. | |
| 2005/0008148 A1 | 1/2005 | Jacobson | |
| 2005/0243061 A1 | 11/2005 | Liberty et al. | |
| 2006/0109135 A1 | 5/2006 | Donat et al. | |
| 2006/0258408 A1 | 11/2006 | Tuomela et al. | |
| 2007/0145119 A1 | 6/2007 | Rhelimi | |
| 2007/0190940 A1 | 8/2007 | Lee et al. | |
| 2007/0282783 A1 | 12/2007 | Singh | |
| 2008/0259043 A1 | 10/2008 | Buil et al. | |
| 2009/0094681 A1* | 4/2009 | Sadler | G06F 21/32 726/4 |
| 2009/0233548 A1 | 9/2009 | Andersson et al. | |
| 2010/0003917 A1 | 1/2010 | Hebiguchi et al. | |
| 2010/0113950 A1 | 5/2010 | Lin et al. | |
| 2010/0263031 A1 | 10/2010 | Tsuchiya | |
| 2010/0277435 A1 | 11/2010 | Han et al. | |
| 2010/0311326 A1 | 12/2010 | Klabunde et al. | |
| 2010/0312071 A1 | 12/2010 | Schenk | |
| 2011/0205156 A1 | 8/2011 | Gomez et al. | |
| 2012/0026129 A1 | 2/2012 | Kawakami | |
| 2012/0133605 A1 | 5/2012 | Tanaka | |
| 2012/0249409 A1 | 10/2012 | Toney et al. | |
| 2012/0324368 A1 | 12/2012 | Putz et al. | |
| 2013/0017789 A1 | 1/2013 | Chi et al. | |
| 2013/0174049 A1 | 7/2013 | Townsend et al. | |
| 2014/0085050 A1 | 3/2014 | Luna | |
| 2014/0089672 A1* | 3/2014 | Luna | H04L 9/3231 713/186 |
| 2014/0279528 A1* | 9/2014 | Slaby | H04L 63/0853 705/44 |
| 2014/0282878 A1 | 9/2014 | Ignatchenko et al. | |
| 2014/0325614 A1 | 10/2014 | Rhelimi | |
| 2015/0028996 A1* | 1/2015 | Agrafioti | G06F 21/40 340/5.82 |
| 2015/0073907 A1* | 3/2015 | Purves | G06Q 20/32 705/14.58 |
| 2015/0127541 A1* | 5/2015 | Just | G06Q 20/10 705/44 |
| 2015/0162994 A1* | 6/2015 | Rodzevski | G07C 9/00309 455/39 |
| 2015/0286813 A1* | 10/2015 | Jakobsson | G06F 21/35 726/9 |
| 2016/0166936 A1* | 6/2016 | Millegan | A63F 13/98 463/29 |
| 2016/0173359 A1* | 6/2016 | Brenner | G06F 19/00 600/301 |
| 2016/0174025 A1* | 6/2016 | Chaudhri | H04W 4/02 455/41.1 |
| 2016/0182496 A1* | 6/2016 | Weast | H04W 4/008 726/3 |
| 2016/0191511 A1* | 6/2016 | Tijerina | H04L 63/0853 726/7 |

FOREIGN PATENT DOCUMENTS

| | | | |
|---|---|---|---|
| EP | 1220501 | A2 | 7/2002 |
| EP | 2018038 | A2 | 1/2009 |
| EP | 2378748 | A1 | 10/2011 |
| EP | 2600319 | A1 | 6/2013 |
| EP | 2 733 578 | A2 | 5/2014 |
| JP | 2008073462 | A | 4/2008 |
| JP | 2009049951 | A | 3/2009 |
| WO | 2007096810 | A1 | 8/2007 |
| WO | 2007129237 | A1 | 11/2007 |
| WO | 2009/099498 | | 8/2009 |
| WO | 2011021531 | A1 | 2/2011 |

OTHER PUBLICATIONS

W. Knight, "Human Handshake Opens Data Stream," NewScientist. com, Oct. 7, 2002http://www.newscientist.com/article/dn2891-human-handshake-opens-data-stream.html.
W. Knight, "Skin Used to Transmit Key Data," NewScientist.com, Aug. 5, 2004, http://www.newscientist.com/article/dn6247-skin-used-to-transmit-key-data.html.
"The Nymi White Paper", Nov. 19, 2013, XP055115588, pp. 3,5,6,14-21.
Bionym Inc.: "Nymi by Bionym" Sep. 2, 2013, YouTube Video retrieved from the Internet May 7, 2014 at URL: https://www.youtube.com/watch?v=jUO7Qnmc8vE#t=37.
International Search Report for corresponding International Application No. PCT/IB2015/055076 dated Oct. 19, 2015.
ApplePay: Your Wallet. Without the wallet. Retrieved online: https://www.apple.com/apple-pay/. Print date Apr. 14, 2015, 1 page.

* cited by examiner

BODY AREA NETWORK FOR SECURE PAYMENT

TECHNICAL FIELD

The present invention relates to a system, a first and a second Body Area Network, BAN, enabled devices, and a method performed in a system comprising a first Body Area Network (BAN) enabled and a second BAN enabled device, for performing secure payment at a payment counter by a user of the first and the second BAN enabled devices. More particularly, the present invention comprises the user wearing or carrying the first and the second BAN enabled devices; where the first and the second BAN enabled devices are paired for authorising the user by the second BAN enabled device.

BACKGROUND ART

Conventional internet enabled devices are generally connected by being wired to each other or are connected by utilizing different kinds of short range wireless solutions, also referred to as Personal Area Network, PAN using radio-frequency (RF) techniques such as Bluetooth ©, infrared Data association (IrDA), ZigBee ©, Ultra WideBand (UWB), etc. However, the RF-technique have some drawbacks, e.g. there might be a limited operating time due to relatively high power consumption of the RF transceiver, the risk of interference with other RF systems operating in the same frequency band, and the user is exposed to potentially harmful RF radiation. Moreover, the user needs to manually pair the internet enabled devices, e.g. a wristlet with a mobile phone, in order to establish a RF connection between them.

There is a need for faster, easier and more intuitive ways of securing interaction for a user with various communication devices and with electronic devices by means of easy and convenient methods.

Prior art payment with mobile phones comprises that, from a user view point, the user:
 a) Needs to scan his/her credit cards into the mobile phone;
 b) At payment, hold the phone towards the checkout counter with Near-Field Communication (NFC);
 c) Put finger on the phones fingerprint scanner when it displays "approve transaction xx USD, by putting your finger on the fingerprint scanner".

When a user or consumer wants to make a transaction with e.g. integrated circuit cards, so-called IC cards or "chip cards", such as EMV (short for Europay, MasterCard and Visa) debit or credit cards today, the card's chip and the point-of-sale terminal generate a cryptogram—the transaction's security key—and attach it to the consumer's personal account number (PAN). The cryptogram is generated, in part, by the chip on the card, which was previously given to the consumer by the issuer. The cryptogram is then sent back to the issuing bank, which processes the transaction.

Because the issuer—in other words, the banks that work with the card networks—gave the consumer his card, the issuer is responsible for the quality and security of the cryptogram.

Another prior art product, the so-called Apple Pay, will, in transactions, not only use a cryptogram, but a token as well. The networks—Visa, MasterCard, and American Express— will generate the tokens which, in the case of Apple Pay, will be a 16-digit number that looks exactly like a credit card number, but it generated dynamically.

The process starts when a consumer inputs his credit card into his mobile phone, in case of Apple Pay into his iPhone. When the card is inputted, some of the iPhones, e.g. the iPhone 6 allows for the card to be inputted via scanning, the networks send a token and a cryptogram to the iOS device, which stores them on a special chip, see below. The iOS device, in this state with the cryptogram and token installed, is known as the "token requester." Again, Apple stores the token and cryptogram data on the phone in a "secure element", which is a separate, secure chip within the iPhone especially dedicated to its security. This secure chip is also the only element within the device that can produce a token and cryptogram.

Regarding the transaction, the consumer walks up to a checkout counter holding his iPhone stocked with a token and cryptogram. Apple Pay asks the consumer whether he wants to pay using his device and the NFC terminal sitting there on the checkout counter. He "says" yes in only one way: by using his fingerprint scan. This is the only authentication of the transaction.

This authentication prompts the "secure element" to send the token and cryptogram to the merchant. The network decrypts the cryptogram and determines whether it is authentic or not. If it is deemed authentic, the network will pass it along to the issuer, i.e. the bank, which then decrypts the token. In other words, every party to the transaction decrypts something.

Once the issuer decrypts the token and determines that it is authentic, the issuer/bank authorizes the transaction. Money is then credited to the merchant and marked as an amount owed by the cardholder.

Another prior art, EP2733578A2, discloses an embodiment where in a commercial setting, a device may automatically identify a product (e.g. using RFID, NFC, barcode recognition, or object recognition) when the user picks up the product and may provide information about the product (e.g. nutrition information, source information, or reviews) or the option to purchase the product. Payment for the product may, for example, be accomplished using visual barcode technology on the device. In particular embodiments, the device may be used to pay for a product using NFC, RFID, or any other suitable form of short-distance communication. During payment, the user's information may, for example, be authenticated by the device, which may detect the user's biometric information (e.g. bone structure or skin signature). The device may also automatically provide an indication to the user (e.g. a vibration) when the user is near a product on her shopping list (e.g. stored in the device) or another list (e.g. a wish list of the user's friend).

Using biometrics and fingerprint comprise problems and have potential setbacks:
 a) The fingerprint algorithm must always balance false-negatives, i.e. failed when it should have passed, and false-positives, i.e. success when it should have failed, and user experience connected with this wrong passes and wrong fails.
 b) Giving away biometrics information to a mobile phone manufacturer or provider may over time be seen as a problem, as the user only has one fingerprint on each finger and fingerprints cannot be changed.
 c) There are examples of how fingerprints are stolen and used to hack mobile phones.
 d) The security of fingerprints is reduced by the fact that there is a risk that a fingerprint reader will detect another person than the real user as having a fingerprint which matches the real user's and thus this other person could approve a payment on the real user's mobile phone by fingerprint scanning.

With regards to fingerprint readers, there are different types of fingerprint readers on the market, but the basic idea behind each is to measure the physical difference between ridges and valleys. When a finger touches or rolls onto a surface, the elastic skin deforms. The quantity and direction of the pressure applied by the user, the skin conditions and the projection of an irregular 3D object, i.e. the finger, onto a 2D flat plane introduce distortions, noise and inconsistencies in the captured fingerprint image. These problems result in inconsistent, irreproducible and non-uniform irregularities in the image. During each acquisition, therefore, the results of the imaging are different and uncontrollable. The representation of the same fingerprint changes every time the finger is placed on the sensor plate, increasing the complexity of any attempt to match fingerprints, impairing the system performance and consequently, limiting the widespread use of this biometric technology, see e.g. http://en.wikipedia.org/wiki/Fingerprint.

Thus there is a need for a more secure way of performing payment using a mobile phone.

SUMMARY OF THE INVENTION

An aspect of the present disclosure is to provide a solution which seeks to mitigate, alleviate, or eliminate one or more of the above and below identified deficiencies in the art and disadvantages singly or in any combination.

Disclosed is a method performed in a system comprising a first Body Area Network (BAN) enabled device and a second BAN enabled device, for performing secure payment at a payment counter by a user of the first and the second BAN enabled devices, the user wearing or carrying the first and the second BAN enabled devices; where the first and the second BAN enabled devices are paired for authorising the user by the second BAN enabled device; the method comprises:
a) establishing a connection between the payment counter and the first BAN enabled device;
b) sending a BAN signal via BAN from the first BAN enabled device to the second BAN enabled device requiring or asking confirmation from the second BAN enabled device that the second BAN enabled device is in contact with the user's body;
c) receiving a confirmation BAN signal via BAN from the second BAN enabled device to the first BAN enabled device confirming that the second BAN enabled device is in contact with the user's body;
d) receiving a request for payment from the payment counter in the first and/or second BAN enabled device; and
e) confirming the requested payment in the first and/or second BAN enabled device.

The first BAN enabled device may be a communication device, such as a mobile phone or smart phone.

The second BAN enabled device may be a communication device, such as a wearable device, a peripheral device or an accessory, such as wristlet.

Thus secure payment can be performed using BAN providing high security, user friendliness and convenience as disclosed above.

Thus when paying with the mobile phone, i.e. the first BAN enabled device, at a payment counter using an established wireless connection with the payment counter, the user will be prompted to accept the payment, and if he/she does, the wristlet, i.e. the second BAN enabled device, is asked for confirmation in form of credentials or a the code over BAN, and if the valid credential or code is received, the transaction is approved.

The payment counter may be a physical payment counter in a physical shop or store, such as a checkout counter, a payment terminal etc. for paying with payment cards, debit cards, credit cards etc. The payment counter may be a virtual payment counter in an online shop or internet shop for paying with payment cards, debit cards, credit cards etc.

BAN signals will typically function when a BAN device is within 1-2 cm from the body of a user, thus the BAN devices can be on/in the body, in the hand, in a pocket in clothes close to body etc. For example the first BAN enabled device in the form of e.g. a mobile phone may be held in the hand of the user during the method. Alternatively the first BAN enabled device in the form of e.g. a mobile phone may be in a pocket in the clothes of the user. For example the second BAN enabled device in the form of e.g. a wristlet may be on the wrist of the user.

The first and second BAN enabled devices are paired. The devices are paired for connecting the devices, verifying the user of the devices, and/or authenticating user of the devices. For example pairing is performed once per days e.g. at home in the morning when the second device, e.g. a wristlet, is put on the arm on the user and the first device, e.g. a mobile phone, is turned on by the user.

The pairing is for authorising the user, i.e. using the second BAN enabled device, e.g. wristband to authorise the user, i.e. the user confirms that he/she wants to use the second BAN enabled device, e.g. wristband to (auto) unlock of the first BAN enabled device, e.g. mobile phone, and e.g. also to authorize for payment, e.g. by typing a longer code.

The connection between the payment counter and the first BAN enabled device may be established using Near-Field Communication (NFC) or BAN.

In case the confirmation signal from the second BAN enabled device is not received in the first BAN enabled device, the user can be prompted on the first BAN enabled device, e.g. the mobile phone or on the second BAN enabled device, e.g. wristband, to manually type in his/her credentials, e.g. a pin or passcode. The confirmation BAN signal may fail if the second BAN enabled device, e.g. wristband is not on the body of the user or if the credential, e.g. code, is wrong.

Confirming that the second BAN enabled device is in contact with the user's body corresponds to authenticating the user by the second BAN enabled device.

The request for payment from the payment counter may be in the form of e.g. a message on the display of the first or second BAN enabled device with the content "approve paying XX USD by pressing OK". A button, e.g. on the display, with the text "OK" may be presented to the user and the user should press this button with his/her finger to approve the payment.

The step of receiving a request for payment from the payment counter in the first and/or second BAN enabled device can be performed before or after sending and/or before or after receiving confirmation from the second BAN enabled device that it is in contact with the user's body.

Approving or confirming the requested payment in the first and/or second BAN enabled device may thus be performed using no biometric data. Apple pay uses biometric data by using the fingerprint of the user for confirming the payment. The security of the present method is that second BAN enabled device, e.g. in the form of a wristlet on the user's wrist, is required to authenticate the user using the first BAN enabled device, e.g. mobile phone, with the payment card details stored thereon for payment at a payment counter.

If the user prefers to keep his first BAN enabled device in e.g. a pocket in his clothes, the confirmation for payment can be performed on the second BAN enabled device. If the user already has his first BAN enabled device in his hand, it may be an advantage for the user to confirm the payment on the first BAN enabled device as the first BAN enabled device typically has a larger display and it may thus be more convenient to press e.g. a button on this display rather than on the smaller display of the second BAN enabled device.

The request for payment can be received and e.g. displayed on both the first and the second BAN enabled devices, or only on one of the device, e.g. dependent on the user settings in the devices.

It is an advantage in terms of security of the present method that the present method does not rely on confirmation of payment from a fingerprint of the user, since a fingerprint can be copied and thus used with a stolen mobile phone connected with this fingerprint. The thief would have time to use the phone for payment before it was realised that the phone was stolen and the payment cards or details connected with phone were blocked.

The advantages in terms of security of using BAN is that payment can only be performed when the first BAN enabled device is in physical contact with the person owning the first BAN enabled device and wearing the second BAN enabled device, e.g. his/her personal body worn BAN device in e.g. the form of a wristlet. Thus misuse of payment using the first and the second BAN enabled devices would require a thief physically forcing the user and owner of the first and second BAN enabled devices to perform and confirm the payment which is corresponds to physical mugging.

In some embodiments the first and the second BAN enabled devices are paired by using BAN, and where the pairing performed in the first BAN enabled device comprises:
a) detecting that the second BAN enabled device is proximate the first BAN enabled device;
b) determining whether both the first BAN enabled device and the second BAN enabled device are in contact with the user's body; and
c) pairing with the second BAN enabled device using a BAN if both the first BAN enabled device and the second BAN enabled device are in contact with the user's body.

The requirement that the first BAN enabled device and the second BAN enabled device are in contact with the user's body is fulfilled when the BAN devices are within 1-2 cm from the body of the user, thus the BAN devices can be on/in the body of the user, such as on the wrist of the user; in the hand of the user; in a pocket in clothes close to body of the user etc.

The detection of whether the BAN devices are in contact with the user's body can be performed by means of e.g. a sensor, such as a capacitive sensor which based on capacitive coupling, takes human body capacitance as input.

In some embodiments the pairing comprises storing a first credential onto the second BAN enabled device from the first BAN enabled device. Thus a first credential e.g. in the form of a randomly generated first passcode or first key or challenge response protocols etc, is written onto the second BAN enabled device, e.g. wristlet, from the first BAN enabled device, e.g. mobile phone, when the two devices are paired, e.g. in the morning when the user puts the wristlet the his/her wrist and turns on the mobile phone.

In some embodiments authorising the user by the second BAN enabled device comprises unlocking the first BAN enabled device with the second BAN enabled device using a BAN, and where the authorisation performed at the first BAN enabled device comprising:
a) establishing a BAN link/connection with the second BAN enabled device in contact with the user's body responsive to the user actuating a user control on the first BAN enabled device, wherein the BAN link/connection uses the user's body as a transmission medium;
b) authenticating the second BAN enabled device over the BAN link/connection using the first credential; and
c) unlocking the first BAN enabled device for the user if the authentication is successful.

Thus authorising may be confirming that the second enabled BAN device is at the body of the user and the authorisation may comprise asking and receiving a first credential, e.g. a first passcode.

The unlocking of the first BAN enabled device may be performed such as during the day, when the user wish to open the first BAN enabled device, e.g. mobile phone which is locked by a code, or when the user wish to use the two BAN enabled devices, e.g. the phone and the wristlet, for payment at a payment counter in a shop.

Authenticating the second BAN enabled device comprises receiving the first credential from the first BAN enabled device over the BAN link/connection. Thus the authentication is successful if the first credential received over the BAN link/connection is valid.

For example in the morning when the user wake up, the user pushes her phone's power button and logs into her phone with her credentials e.g. pin, which may be digits, alphanumeric, graphics, biometrics, or other, and if the user wears a wristband with a BAN chip, or a different BAN device such as a ring, a pocket coin, or a plaster with a BAN chip or something else, the phone will detect the BAN chip. The phone prompts the user if the user wants to use the wristband for auto unlock of the phone, the next time the power button is pushed. The prompt would be something like "do you want to use your wristband to authorize you?".

If the user approves on the suggestion to use the wristband for unlock, credentials e.g. a code/key will be written onto the wristband from the phone. This credential, e.g. code is a randomly generated key. The next time the user pushes the power button, the phone will i) check if there is a BAN device on the body by sending a BAN signal, and ii) ask the BAN device to respond with the credentials, e.g. code. If the credentials, e.g. code, is the same as previously sent, it will unlock the phone.

The above relates to pairing of two BAN enabled devices, the first BAN enabled device e.g. a mobile phone, and a second BAN enabled device, e.g. a wristband. Authorization to use the BAN enabled devices for performing secure payment can be performed simultaneous and/or parallel with the pairing of the devices.

When the user accepts the "do you want to use your wristband authorize you", it may encompass not only authorization for unlocking of the phone but also for payment. Naturally, this can be a setting if authorization shall only apply to unlock of the phone, or if it shall also encompass payment. Alternatively it can be a different credential, e.g. pin, maybe longer, that the user enters into a specific app in the phone, for the payment purpose.

In some embodiments authorising the user by the second BAN enabled device to perform secure payment comprises the user entering a second credential in a respective software program on the first BAN enabled device.

This may comprise starting a separate application, such as an app, on the first BAN enabled device. Thus for authorising the second BAN enabled device for payments this further step may be required for security reasons. This further step may be performed when the second BAN enabled device, e.g. wristlet, is put on the arm of the user in the morning, i.e. performed once per day. This need not be performed at the actual moment when payment should be performed in a shop. The user can prepare for secure payment by entering the second credential, e.g. second passcode, key etc., in the morning knowing that he/she will use the two BAN enabled device for secure payment during the day.

The second credential, e.g. second passcode, may be selected by the user him/herself or may be generated and communicated from the payment card administration, such as mastercard, VISA card, the user's bank etc.

Security wise, the credentials, e.g. pin, that the user entered to unlock the phone, or if it is a separate app, shows that the user is the user of the phone. Only the user of the phone should know its pin, and if there is a risk that someone else knows the pin, the user should change its pin. This is similar to that only the owner of the phone has a fingerprint that matches the phone, with the difference that you can never change your finger. Thus for the prior art method called Apple Pay, the transaction by putting the finger on the fingerprint scanner on the phone, is similar to the present solution using BAN, where the user approves the payment by selecting the OK button. In the present solution, when the OK button is selected the phone will ask the wristband with BAN for the credentials, e.g. code, and security wise this is as secure as when the user enters the credentials, e.g. pin, manually each and every time the phone should be used for payment.

In some embodiments the first credential and the second credential are the same credential or different credentials. It is an advantage for the user if the first and second credentials, e.g. passcodes, are the same as the user does not need to remember several credentials. However, in terms of security it is an advantage if the first and second credentials are different, since then the security is high, as payment requires a second credential, which may be a longer and/or more complex passcode, than the first credential, which may be a short an easy passcode just for unlocking the first BAN enabled device.

In some embodiments the method comprises scrapping, removing or deleting the first credential and/or the second credential from the second BAN enabled device, when the second BAN enabled device is removed from the user's body. The removal may be detected by e.g. the capacitive sensor in the second BAN enabled device. Thus it is an advantage in terms of security that the second BAN enabled device can only be used for secure payment as long as it is on or at the body of the user. If the second BAN enabled device is e.g. stolen from or lost by the user, payment cannot be performed using the first BAN enabled device alone, e.g. if the first BAN enabled device is also stolen or lost. Thus security is provided in that the second BAN enabled device, e.g. wristband with BAN, detects when it is on or off the body, e.g. via a capacitive sensor in the second BAN enabled device. As soon as the second BAN enabled device leaves the body, the credentials, e.g. code, is scrapped from the second BAN enabled device. Thus the first and second BAN enabled devices should be paired and authorized again if they should be used for payment.

In some embodiments the method comprises:
a) if a confirmation BAN signal via BAN from the second BAN enabled device is not received in the first BAN enabled device,
b) approving/confirming the requested payment on the first BAN enabled device comprises the user entering a third credential.

Thus if the confirmation signal is not received, the user can be prompted on the first or second BAN enabled device, e.g. phone or wristlet, to manually type in a third credential, such as a third passcode, pin or code. The confirmation signal may fail if the first and second devices are not paired, or if the wristlet is not on the body of the user or if the first or second credentials are not valid etc. The third credential may the same as the first and/or second credential, or the third credential may be different from the first and/or from the second credential.

In some embodiments establishing a connection between the payment counter and the first BAN enabled device comprises using a near-field communication (NFC) means in the payment counter and in the first BAN enabled device. Thus the communication may be between processors, such as dedicated processors, in first BAN enabled device and in the payment counter. Thus the user holds or touches the first BAN enabled device, e.g. mobile phone, at the payment counter to establish the NFC connection. Near-field communication uses electromagnetic induction between two loop antennas located within each other's near field, effectively forming an air-core transformer. It operates within the globally available and unlicensed radio frequency ISM band of 13.56 MHz on ISO/IEC 18000-3 air interface and at rates ranging from 106 kbit/s to 424 kbit/s. NFC involves an initiator and a target; the initiator actively generates an RF field that can power a passive target.

In some embodiments establishing a connection between the payment counter and the first BAN enabled device comprises using a BAN connection in the payment counter and in the first BAN enabled device. Thus the communication may be between processors, such as dedicated processors, in first BAN enabled device and in the payment counter. Thus the user holds the first BAN enabled device, e.g. mobile phone, in his/her hand or pocket and touches the payment counter with his/her finger for establishment of the BAN connection.

In some embodiments confirming the requested payment in the first and/or second BAN enabled device comprises the user pressing/touching a key on a display on the first and/or second BAN enabled device. The display may be a graphical user interface, a screen etc. The key may be a virtual or soft or specific or hard key, e.g. an "OK" button or key on the display. Alternatively, the user is touching his finger on a display on the payment counter, e.g. a graphical user interface or screen in order to approve or confirm the payment.

In some embodiments the method comprises providing payment card details to the first BAN enabled device.

In some embodiments providing payment card details to the first BAN enabled device comprises scanning the payment card with the first BAN enabled device.

Scanning of payment card may be performed e.g. by a camera or scanner in the first BAN enabled device, e.g. phone, e.g. using radio frequency, RF. Alternatively the user should type in the payment card details in the first BAN enabled device, e.g. phone, manually. Providing the payment card details should be performed only once, afterwards the payments card details will be saved in a secure location in the first BAN enabled device or in the a remote cloud storage. The user's existing payments card can be used, there is no need for a new payment or credit card to be used with the BAN enabled devices.

In some embodiments the method comprises using biometrics, such as pulse, electrocardiogram (EKG or ECG), impedance, fingerprints, and/or tremor, of the user to confirm the user. These biometrics may be used as a further security for payment. By means of these biometrics, a specific user may be detected and confirmed by the BAN enabled devices. Thus a specific, predefined user, defined by his/her biometrics, may be recognised and authorised, whereby not just any person knowing the valid credentials can use the BAN enabled device, e.g. use for payment. Thus biometrics e.g. fingerprint, can complement the present solution with BAN. If the user uses fingerprint, or a combination of fingerprint and pin, to, once per day, authenticate herself on the phone, a code can be sent to a wristband with BAN, as described above. And the next time payment takes place, the user does not need to use the fingerprint sensor, but BAN is used instead.

According to an aspect disclosed is a system comprising a first Body Area Network (BAN) enabled device and a second BAN enabled device, for performing secure payment at a payment counter by a user of the first and the second BAN enabled devices, the user wearing or carrying the first and the second BAN enabled devices; where the first and the second BAN enabled devices are paired for authorising the user by the second BAN enabled device; the system comprises:
  a) a detector unit configured for detecting the presence of the user's body;
  b) a radio communication interface configured to communicate with the first and/or second BAN enabled devices;
  c) a processing circuitry configured for:
  d) establishing a connection between the payment counter and the first BAN enabled device;
  e) sending a BAN signal via BAN from the first BAN enabled device to the second BAN enabled device requiring confirmation from the second BAN enabled device that the second BAN enabled device is in contact with the user's body;
  f) receiving a confirmation BAN signal via BAN from the second BAN enabled device to the first BAN enabled device confirming that the second BAN enabled device is in contact with the user's body;
  g) receiving a request for payment from the payment counter in the first and/or second BAN enabled device;
  h) confirming the requested payment in the first and/or second BAN enabled device.

The system comprising a first Body Area Network, BAN, enabled device and a second Body Area Network, BAN, enabled device may be configured for performing the method according to the disclosure and the embodiments.

According to an aspect disclosed is a first BAN enabled device for performing secure payment at a payment counter by a user of the first BAN enabled device, the user wearing or carrying the first BAN enabled device and a second BAN enabled device; where the first and the second BAN enabled devices are paired for authorising the user by the second BAN enabled device; the first BAN enabled device comprises:
  a) a detector unit configured for detecting the presence of the user's body;
  b) a radio communication interface configured to communicate with the second BAN enabled device;
  c) a processing circuitry configured for:
  d) establishing a connection between the payment counter and the first BAN enabled device;
  e) sending a BAN signal via BAN from the first BAN enabled device to the second BAN enabled device requiring confirmation from the second BAN enabled device that the second BAN enabled device is in contact with the user's body;
  f) receiving a confirmation BAN signal via BAN from the second BAN enabled device to the first BAN enabled device confirming that the second BAN enabled device is in contact with the user's body;
  g) receiving a request for payment from the payment counter in the first and/or second BAN enabled device; and
  h) confirming the requested payment in the first and/or second BAN enabled device.

The first Body Area Network, BAN, enabled device configured for being connected with a second BAN enabled device may be configured for performing the method according to the disclosure and the embodiments.

The first BAN enabled device may be a mobile phone, a smart phone, a tablet, a portable electronic device, a handheld device etc.

According to an aspect disclosed is a second BAN enabled device for performing secure payment at a payment counter by a user of the second BAN enabled device, the user wearing or carrying the second BAN enabled device and a first BAN enabled device; where the first and the second BAN enabled devices are paired for authorising the user by the second BAN enabled device; the second BAN enabled device comprises:
  a) a detector unit configured for detecting the presence of the user's body;
  b) a radio communication interface configured to communicate with the first BAN enabled device;
  c) a processing circuitry configured for:
  d) receiving a request from the first BAN enabled device in the second BAN enabled device to confirm that the second BAN enabled device is in contact with the user's body, upon establishment of a connection between the payment counter and the first BAN enabled device;
  e) sending a confirmation BAN signal via BAN from the second BAN enabled device to the first BAN enabled device confirming that the second BAN enabled device is in contact with the user's body;
  f) receiving a request for payment from the payment counter in the second BAN enabled device; and
  g) confirming the requested payment in the second BAN enabled device.

The second Body Area Network, BAN, enabled device configured for being connected with a first BAN enabled device may be configured for performing the method according to the disclosure and the embodiments.

The second BAN enabled device may be a bodyworn device, a handheld device, an implanted device in the user etc. The second BAN enabled device may be a watch, a wristlet, a necklace, a ring, a headset, a hearing device, an implant etc.

According to an aspect disclosed is a payment counter for performing secure payment by a user of a first BAN enabled device and/or a second BAN enabled device, the user wearing or carrying the first and the second BAN enabled devices; where the first and the second BAN enabled devices are paired for authorising the user by the second BAN enabled device; the payment counter comprises:

a) a detector unit configured for detecting the presence of the user's body;
b) a radio communication interface configured to communicate with the first and/or second BAN enabled devices;
c) a processing circuitry configured for:
d) establishing a connection between the payment counter and the first BAN enabled device;
e) sending a request for payment from the payment counter to the first and/or second BAN enabled device; and
f) receiving a confirmation of the requested payment from the first and/or second BAN enabled device.

According to an aspect disclosed is a method performed in a first Body Area Network (BAN) enabled device for performing secure payment at a payment counter by a user of the first BAN enabled device, the user wearing or carrying the first BAN enabled device and a second BAN enabled device; where the first and the second BAN enabled devices are paired for authorising the user by the second BAN enabled device; the method comprises:
a) establishing a connection between the payment counter and the first BAN enabled device;
b) sending a BAN signal via BAN from the first BAN enabled device to the second BAN enabled device requiring confirmation from the second BAN enabled device that the second BAN enabled device is in contact with the user's body;
c) receiving a confirmation BAN signal via BAN from the second BAN enabled device to the first BAN enabled device confirming that the second BAN enabled device is in contact with the user's body;
d) receiving a request for payment from the payment counter in the first BAN enabled device;
e) confirming the requested payment in the first BAN enabled device.

It is an advantage of this method that the first BAN enabled device, e.g. mobile phone, is used for approving the payment by BAN in the payment counter, such that user can keep the second BAN enabled device, e.g. wristlet, hidden, e.g. on the wrist under his/her clothes, as there is no need for touching the second BAN enabled device when confirming payment. Only the first BAN enabled device is the active device in this method. The second BAN enabled device is used for authorising the user.

According to an aspect disclosed is a method performed in a second Body Area Network (BAN) enabled device for performing secure payment at a payment counter by a user of the second BAN enabled device, the user wearing or carrying the second BAN enabled device and a first BAN enabled device; where the first and the second BAN enabled devices are paired for authorising the user by the second BAN enabled device; the method comprises:
a) receiving a request from the first BAN enabled device in the second BAN enabled device to confirm that the second BAN enabled device is in contact with the user's body, upon establishment of a connection between the payment counter and the first BAN enabled device;
b) sending a confirmation BAN signal via BAN from the second BAN enabled device to the first BAN enabled device confirming that the second BAN enabled device is in contact with the user's body;
c) receiving a request for payment from the payment counter in the second BAN enabled device;
d) confirming the requested payment in the second BAN enabled device.

It is an advantage of this method that the second BAN enabled device, e.g. wristlet, is used for approving the payment by BAN in the payment counter, such that user can keep the first BAN enabled device, e.g. mobile phone, in a pocket, as there is no need for touching the first BAN enabled device when confirming payment. The second BAN enabled device is the active device in this method. The first BAN enabled device is used for authorising the second BAN enabled device, not used in active payment.

According to an aspect disclosed is a method performed at a payment counter for performing secure payment at the payment counter for/by a user of a first BAN enabled device and/or a second BAN enabled device, the user wearing or carrying the first and the second BAN enabled devices; where the first and the second BAN enabled devices are paired for authorising the user by the second BAN enabled device; the method comprises:
a) establishing a connection between the payment counter and the first BAN enabled device;
b) sending a request for payment from the payment counter to the first and/or second BAN enabled device;
c) receiving a confirmation of the requested payment from the first and/or second BAN enabled device.

The method according to the disclosure and the embodiments of the method may be configured to be performed in a device and/or in a system according to the aspects above.

The features of the above-mentioned embodiments can be combined in any combinations.

The present solution with BAN is safer than the prior art Apple Pay because:

The credential, e.g. login pin, into the phone can be long, since it is seldom entered. If a wristband is used, it is typically entered once per day. With a chip in a plaster on the body, or in the body, or with a ring on the finger, it may be entered very seldom. If compared with the false-positives described in the Background section, the risk of someone guessing can be low, by for example using a 10 digit number as login.

The fingerprint can be stolen.

The fingerprint can never be changed, if stolen, while the credentials, e.g. code, can be changed.

If the second BAN device, e.g. wristband, is stolen, then the credentials, e.g. code, is removed so the wristband can't be used. The wristband detects that it is kept on the body with e.g. a capacitive sensor, or other sensor, e.g. pulse meter, or tremor detection. Thereby it serves no purpose to steal a BAN device, e.g. a wristband, since there is never any information on it.

If a thief (user A) walks up to the checkout counter, to pay for something, and steals the phone of user B and holds it into the checkout counter with NFC positioned, and holds the hand of User B so that their bodies connect, the transaction can get through. The BAN signal will transport from the phone of B (held in the hand of the thief A) cross the body of A over to the body of B, and reach the wristband of B, which will respond with the code. However, this corresponds to physical mugging.

The present solution with BAN is more convenient for the user than Apple Pay, since with the present solution using BAN it is sufficient to put the finger on the "accept" button on the screen. The present solution with BAN may also be faster, since the fingerprint scanning can take some time (a few 100 ms).

Other advantages with the present solution using BAN is that:

The cost of the solution is low. The wristband with BAN has a total cost <2 USD. The cost in the phone is <1 USD. A finger print reader is in the range of 7 USD.

The size of the fingerprint reader is large requiring space in and on the phone thereby preventing that the phone can be small, whereas a BAN chip in the phone is very small, thereby allowing the phone and/or the wristband to be small.

BRIEF DESCRIPTION OF THE DRAWINGS

Further aspects, features and advantages of the present invention will appear from the following detailed description of the invention, wherein embodiments of the invention will be described in more detail with reference to the accompanying drawings, in which.

DETAILED DESCRIPTION

Figure 1:
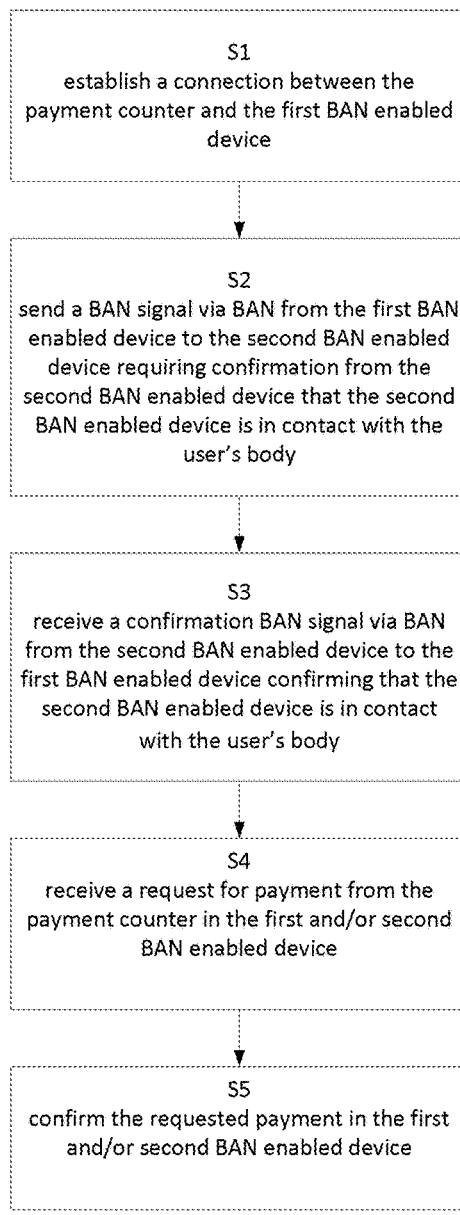
FIG. 1 shows a flow chart of the present method performed in a system comprising a first Body Area Network (BAN) enabled and a second BAN enabled device, for performing secure payment at a payment counter.

Aspects of the present invention will be described more fully hereinafter with reference to the accompanying drawings. The devices and methods disclosed herein can, however, be realized in many different forms and should not be construed as limited to aspects set forth herein. Like reference signs refer to like elements throughout the text.

As used herein, the term "first BAN enabled device" includes a Body Area Network device, a Body Coupled Communication (BCC) device and will typically be a handheld device, such as a mobile phone or mobile device. The term "mobile device" includes mobile communication device and mobile radio communication equipment. Portable communication devices and mobile communication devices may be used synonymously. The term "mobile device" may be referred to below as a mobile phone (or as a mobile telephone, portable phone or portable telephone), a portable device, a portable radio terminal or a portable terminal, which includes all electronic equipment, but not limited to, capable of being used for voice and/or data communication. The term mobile phone or phone will be used synonymously with the term first BAN enabled device throughout the description.

As will be appreciated, the invention may be used with mobile phones, other phones, smartphones, personal digital assistants (PDAs), computers, tablets, other electronic communication devices, etc., for brevity, the invention will be described by way of examples with respect to mobile phones, but it will be appreciated that the invention may be used with other electronic communication devices.

As used herein, the term "second BAN enabled device" includes a Body Area Network device, a Body Coupled Communication (BCC) device and will typically be a wearable device, an accessory device, a peripheral device or electronic bodyworn device, such as an wristlet, wristband, watch, smart watch, implant, necklace, ring for a finger, earring, jewelry, headband etc. The term wristband or wristlet will be used synonymously with the term second BAN enabled device throughout the description.

Body Area Network, BAN, or Body-Coupled Communications, BCC, also referred to as Body-Based Communication, BBC or Near-Body Communication, NBC, has been proposed as a promising alternative to radio frequency, RF, communication as a basis for Body/Personal Area Network, BAN/PAN, communication. BCC allows for an exchange of information between a plurality of devices which are in contact with or in close proximity of a living body. This can be achieved by the transmitting BCC-/BAN-antenna that provides a capacitive or galvanic coupling of low-energy electrical fields onto the body surface, i.e. leakage currents with a small magnitude is set to spread out over the human body. The small currents are then detected by a receiver BCC-/BAN-antenna, located on the same body or on another body in contact with the first. Thus, signals are conveyed over the body instead of through the air. As such, the communication is confined to the volume close to the body in contrast to RF communications, where a much larger volume is covered. Therefore, communication is possible between devices situated on, connected to, or placed close to the body. The power consumption of BCC-/BAN-antennas is very low.

A body area network, BAN, also referred to as a wireless body area network, WBAN or body sensor network, SSN, is a wireless network of wearable communication devices. BAN enabled devices may be embedded inside the body, implants, may be surface-mounted on the body in a fixed position or may be accompanied devices which humans can carry in different positions, in clothes pockets, by hand or in various bags.

More and more devices get support for Body Area Network, BAN, defined by IEEE 802.15. The first devices have their background in the medical area, as BAN is a communication standard optimized for low power devices and operation on, in or around the human body. BAN makes it possible to communicate when normally 2 m or less between the devices over the body. Operation is in global, license-exempt band like 2.4 MHz. Peer-to-Peer, and Point to Multi-point communication can be established and it contains efficient sleep modes. Today, a maximum of 100 BAN enabled devices can be connected and there is a network density limit of 2-4 networks/m².

FIG. 1 shows a flow chart of the present method performed in a system comprising a first Body Area Network (BAN) enabled and a second BAN enabled device, for performing secure payment at a payment counter by a user of the first and the second BAN enabled devices, the user wearing or carrying the first and the second BAN enabled devices; where the first and the second BAN enabled devices are paired for authorising the user by the second BAN enabled device. The method comprises a number of steps or operations:

In S1 a connection is established between the payment counter and the first BAN enabled device.

In S2 a BAN signal is sent via BAN from the first BAN enabled device to the second BAN enabled device requiring confirmation from the second BAN enabled device that the second BAN enabled device is in contact with the user's body.

In S3 a confirmation BAN signal is received via BAN from the second BAN enabled device to the first BAN enabled device confirming that the second BAN enabled device is in contact with the user's body.

In S4 a request for payment from the payment counter is received in the first and/or second BAN enabled device.

In S5 the requested payment is confirmed in the first and/or second BAN enabled device.

Figure 2:
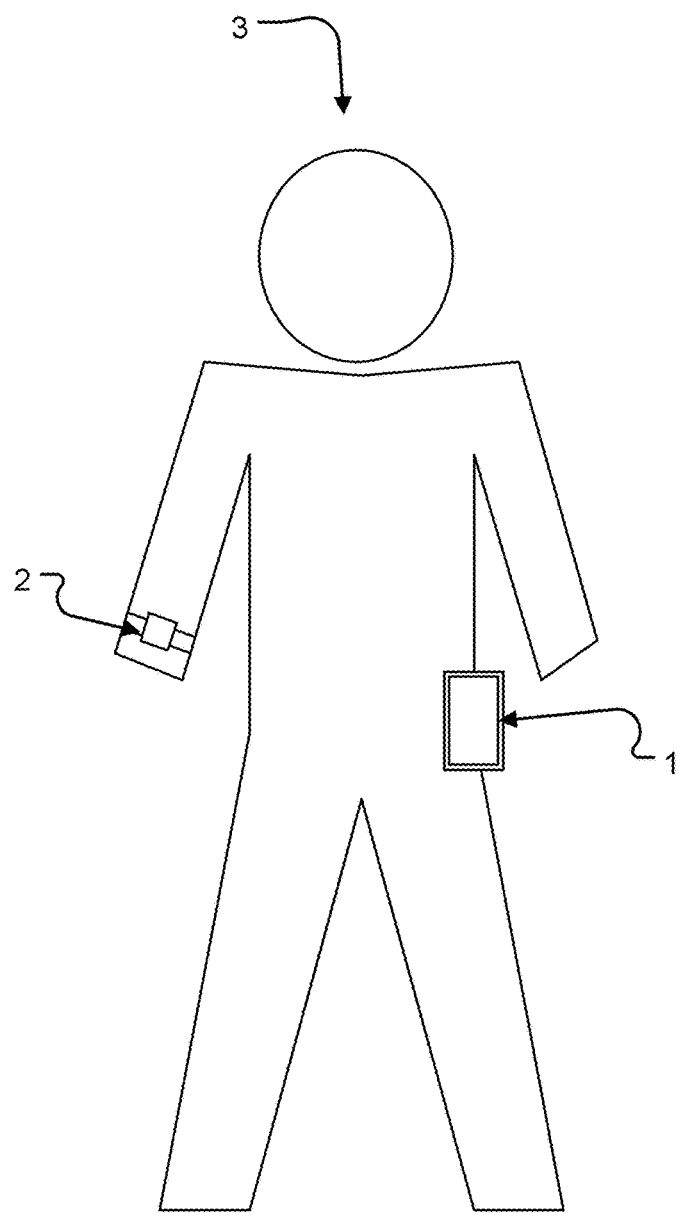
FIG. 2 shows an example of a user carrying or wearing a first Body Area Network (BAN) enabled device and a second BAN enabled device.

FIG. 2 shows an example of a user 3 carrying or wearing a first Body Area Network (BAN) enabled device 1 and a second BAN enabled device 2. The BAN enabled devices 1, 2 are adapted and configured to be carried or worn on the body by the user 3, such as the user carrying the first BAN enabled device in his/her hand or pocket, and such as the user wearing the second BAN enabled device on his/her wristlet, hand, head, arm, skin, inside body etc.

FIG. 2 thus shows an example of a system comprising a first Body Area Network (BAN) enabled device 1 and a second BAN enabled device 2, for performing secure payment at a payment counter by a user 3 of the first 1 and the second 2 BAN enabled devices, the user 3 wearing or carrying the first 1 and the second 2 BAN enabled devices; where the first 1 and the second BAN enabled devices 2 are paired for authorising the user 3 by the second BAN enabled device 2.

FIG. 3 shows examples of a first Body Area Network (BAN) enabled device 1 and a second BAN enabled device 2.

Figure 3A:
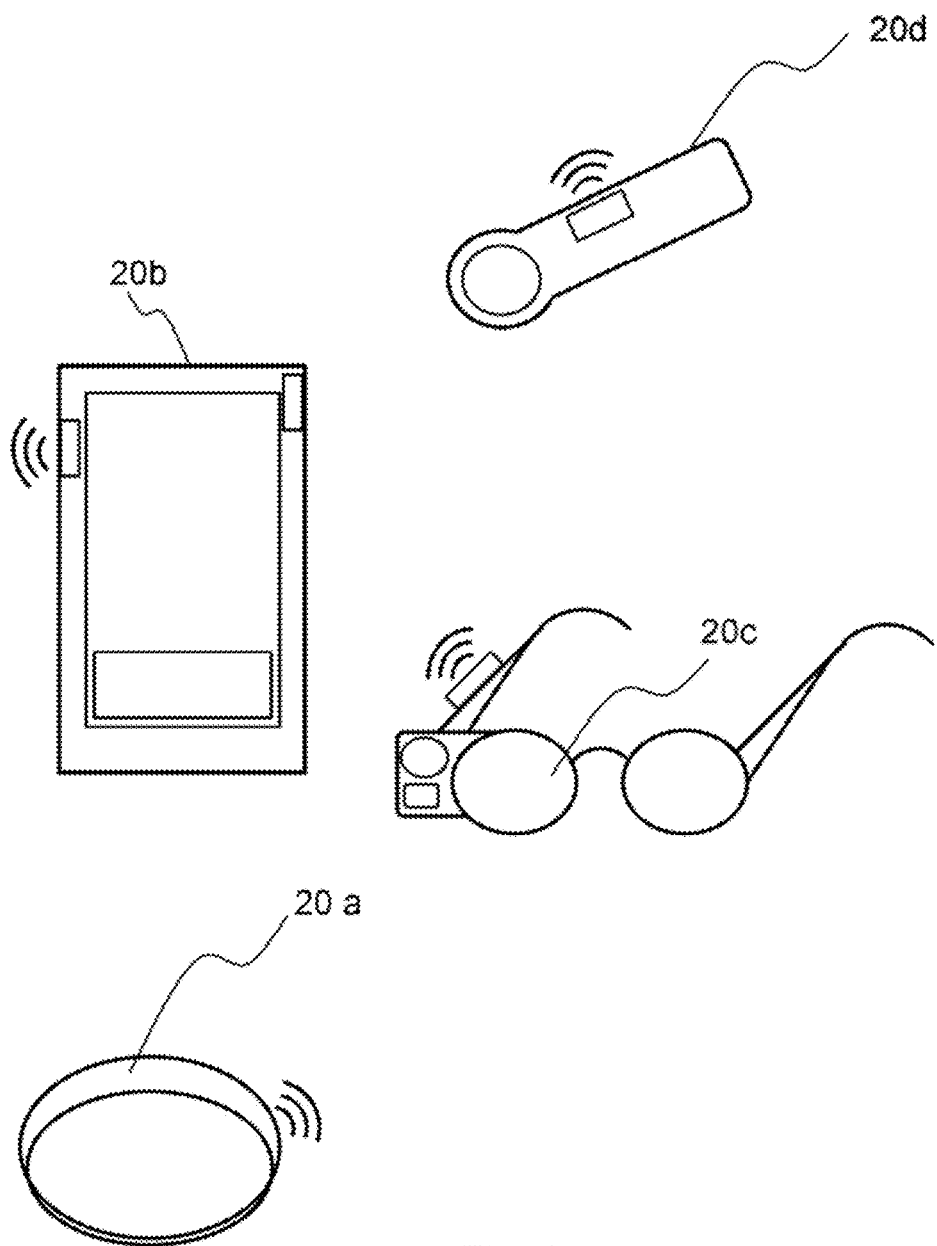
FIGS. 3A-C show examples of a first Body Area Network (BAN) enabled device and a second BAN enabled device.

FIG. 3A shows an example of a first BAN enabled device which is a mobile phone or phone 20b. Examples of a second BAN enabled device are a wristlet 20a, an in-ear hearing device 20d, goggles/glasses 20c.

The BAN enabled devices 1 and 2 can also contain additional communication channels, like Bluetooth Low Energy (BLE), WiFi, etc. to be able to setup a direct connection towards a cloud service (not shown).

Figure 3B:
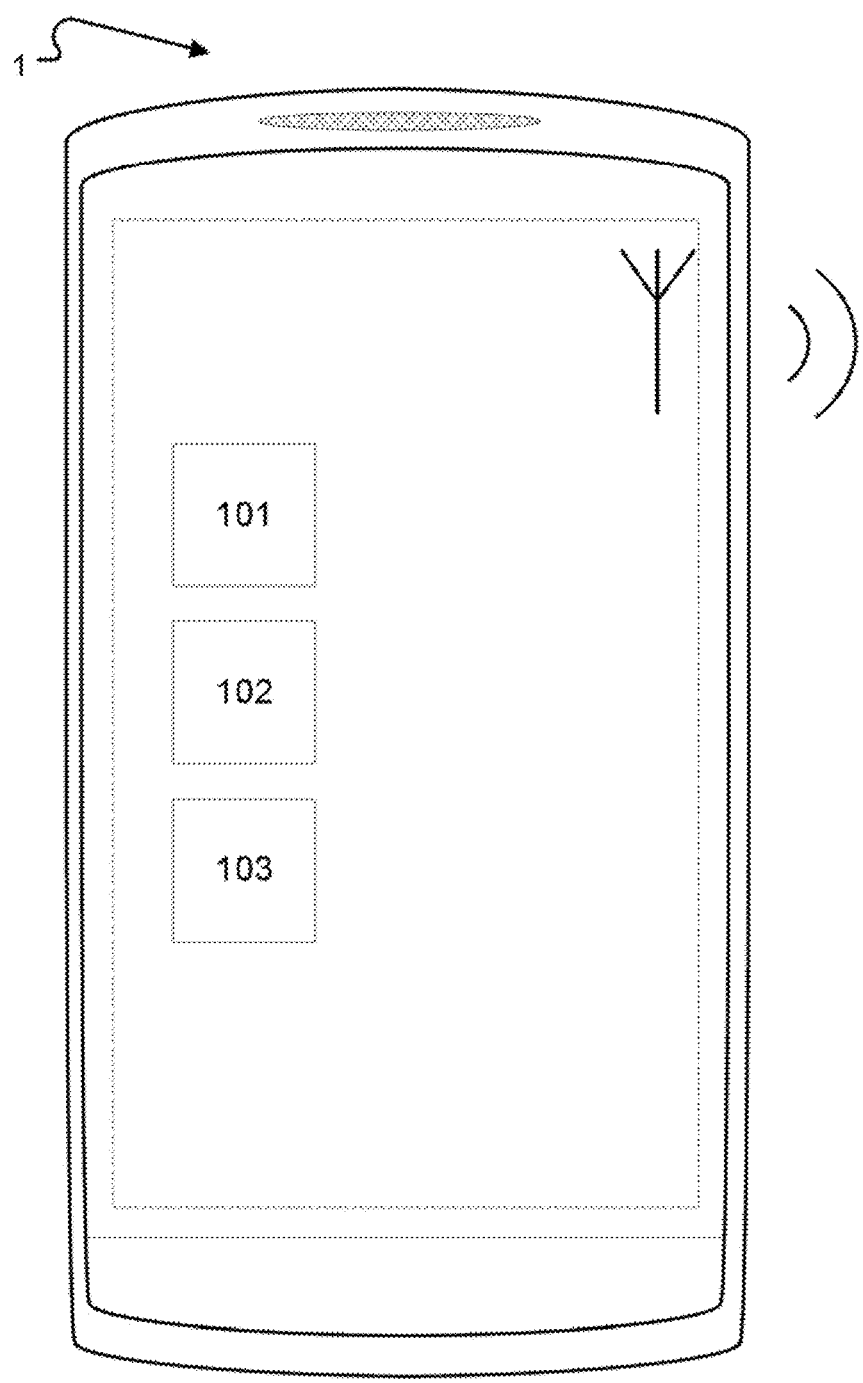

FIG. 3B shows an example of the first BAN enabled device 1 configured for performing secure payment at a payment counter by a user of the first BAN enabled device 1, the user wearing or carrying the first BAN enabled device 1 and a second BAN enabled device 2; where the first 1 and the second BAN enabled devices 2 are paired for authorising the user by the second BAN enabled device 2. The first BAN enabled device 1 comprises:
  a) a detector unit 101 configured for detecting the presence of the user's body;
  b) a radio communication interface 102 configured to communicate with the second BAN enabled device;
  c) a processing circuitry 103 configured for:
  d) establishing a connection between the payment counter and the first BAN enabled device;
  e) sending a BAN signal via BAN from the first BAN enabled device to the second BAN enabled device requiring confirmation from the second BAN enabled device that the second BAN enabled device is in contact with the user's body;
  f) receiving a confirmation BAN signal via BAN from the second BAN enabled device to the first BAN enabled device confirming that the second BAN enabled device is in contact with the user's body;
  g) receiving a request for payment from the payment counter in the first and/or second BAN enabled device; and
  h) confirming the requested payment in the first and/or second BAN enabled device.

Figure 3C:
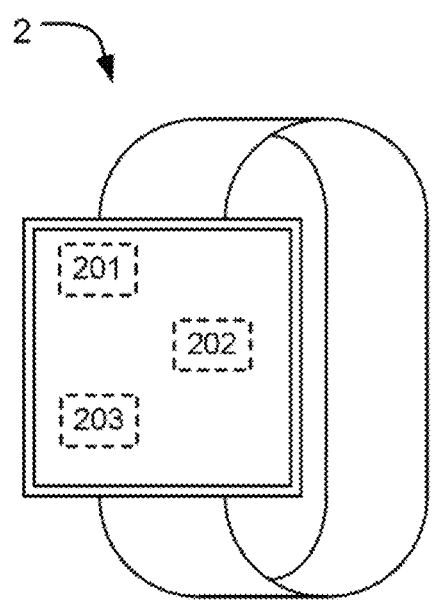

FIG. 3C shows an example of a second BAN enabled device 2 configured for performing secure payment at a payment counter by a user of the second BAN enabled device 2, the user wearing or carrying the second BAN enabled device 2 and a first BAN enabled device 1; where the first 1 and the second BAN enabled devices 2 are paired for authorising the user by the second BAN enabled device 2. The second BAN enabled device 2 comprises:
  a) a detector unit 201 configured for detecting the presence of the user's body;
  b) a radio communication interface 202 configured to communicate with the first BAN enabled device 1;
  c) a processing circuitry 203 configured for:
  d) receiving a request from the first BAN enabled device in the second BAN enabled device to confirm that the second BAN enabled device is in contact with the user's body, upon establishment of a connection between the payment counter and the first BAN enabled device;
  e) sending a confirmation BAN signal via BAN from the second BAN enabled device to the first BAN enabled device confirming that the second BAN enabled device is in contact with the user's body;
  f) receiving a request for payment from the payment counter in the second BAN enabled device; and
  g) confirming the requested payment in the second BAN enabled device.

FIG. 3B and FIG. 3C show that both the first BAN enabled device 1 and the second BAN enabled device 2 comprise a detector unit 101, 201 configured for detecting a tremor signal which indicates the presence of a human body. The detector unit can be a sensor of any kind such as an accelerator, optical sensor, temperature sensor, pulse sensor or the like.

In one embodiment, the detector unit 101, 201 comprises a capacitive touch system. The capacitive sensor system has low power consumption, which is less than 30 micro Amperes, when the electronic module is touched. The sensitive range may be set to the range of 20-30 mm. The capacitive sensor system is always active. As soon as the user touches the BAN enabled device 1, 2, the detector unit 101, 201 starts to sense the presence of a human body.

In one embodiment, the detector unit 101, 201 comprises an accelerometer, which can detect a tremor signal from the user. A tremor signal is a signal indicating the human quiver or tremble movement and the tremor signal is always present in human muscles at a frequency of 8-12 Hz.

In one embodiment, the detector unit comprises a pulse sensor, which can detect the heart rate or blood pulse of the user.

In one embodiment, the detector unit comprises a temperature sensor, which can detect the temperature of the skin of the user.

In one embodiment, the detector unit comprises an optical sensor, which can detect the temperature of the skin of the user.

FIG. 3B and FIG. 3C show that both the first BAN enabled device 1 and the second BAN enabled device 2 comprise a radio communication interface 102, 202 configured to communicate with another BAN enabled device by using BAN.

The first BAN enabled device 1 and the second BAN enabled device 2 may further, e.g. in an electronic module, comprise a data storage configured to store various data. The detector unit 101, 201, the radio communication interface 102, 202 and the processing circuitry 103, 203 may also be configured in the electronic module.

The first BAN enabled device 1 may be a mobile device, e.g. a mobile phone. The second BAN enabled device 2 may be a wearable device, e.g. a wristlet. The mobile phone 1 and wristlet 2 may comprise a controller, DTL, or a processing circuitry 103, 203 that may be constituted by any suitable Central Processing Unit, CPU, microcontroller, Digital Signal Processor, DPS, etc. capable of executing computer program code for executing the method disclosed. However, the method may as well be hardware implemented or a combination of hardware and software. The computer program may be stored in a memory, MEM, not shown. The memory can be any combination of a Read and Write memory, RAM, and a Read only Memory, ROM. The memory may also comprise persistent storage, which for example, can be any single one or combination of magnetic memory, optical memory, or solid state memory or even remotely mounted memory.

The mobile phone 1 and the wristlet 2 may further comprise a wireless communication interface (i/f) arranged for wireless communication with cellular communication systems and/or other wireless communication systems. The wireless communication interface may be adapted to communicate over one or several radio access technologies. If several technologies are supported, the access point typically comprises several communication interfaces, e.g. one WLAN communication interface and one cellular communication interface. The communication interface is e.g. adapted to download a computer program for executing the proposed methods or access a data base comprising device specific information.

The mobile phone 1 and the wristlet 2 may further comprise an input unit, such as a keyboard, microphone and/or a display unit.

The mobile phone 1 and the wristlet 2 may comprise a processing circuitry 103, 203 configured for executing computer code, such as a computer program implementing the proposed method. One example is that the computer code is an application, which may be downloaded from an external server. However, the method may as well be hardware implemented or a combination of hardware and software. The processing circuitry 103, 203 is configured to broadcast a signal, indicating ability to connect to the BAN enabled device 1, 2, when said detector unit 101, 201 detects the presence of a human body.

Figure 4:
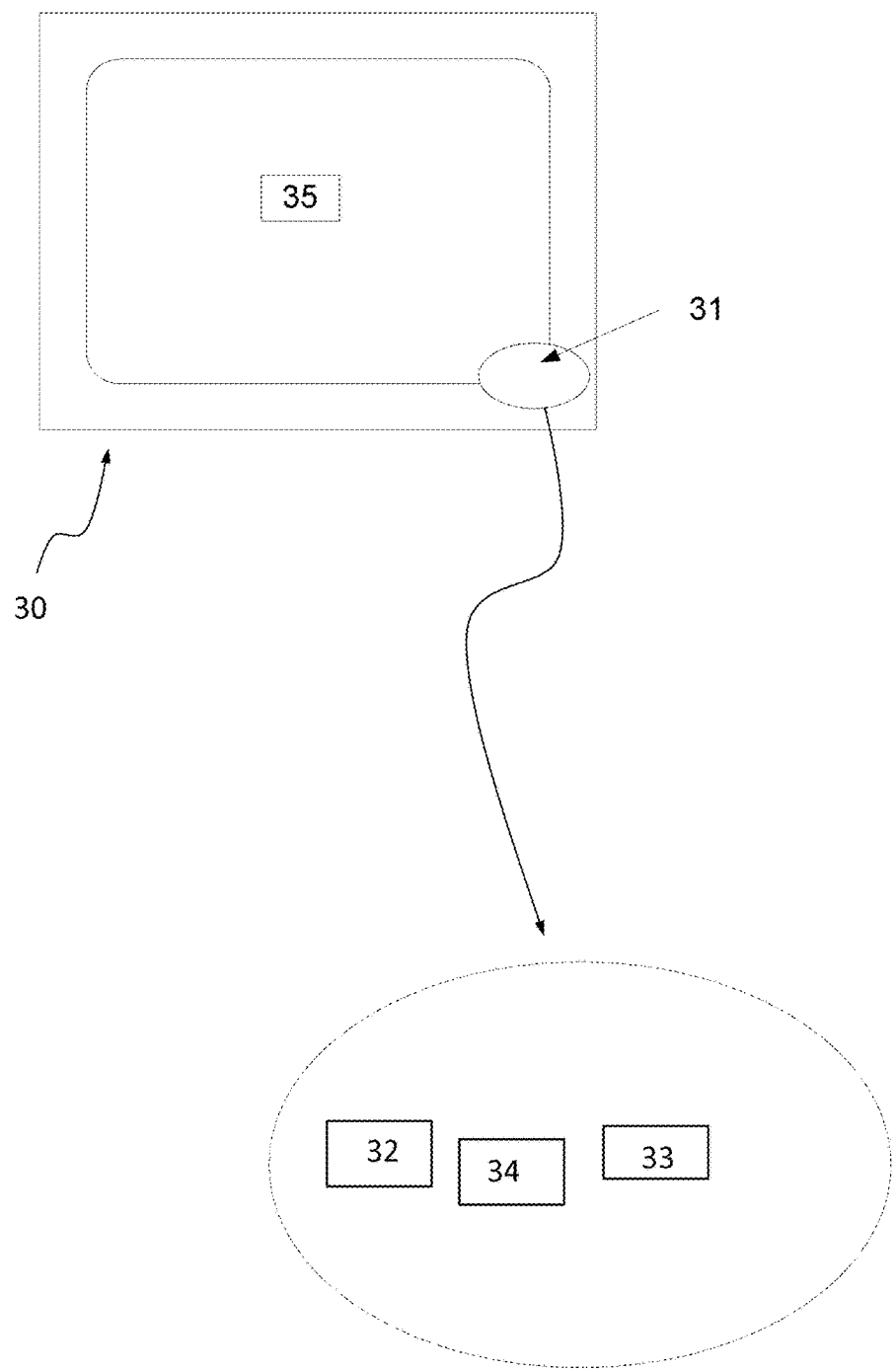
FIG. 4 shows an example of a payment counter for performing secure payment by a user of a first BAN enabled device and/or a second BAN enabled device.

FIG. 4 shows an example of a payment counter 30 for performing secure payment by a user of a first BAN enabled device and/or a second BAN enabled device, the user wearing or carrying the first and the second BAN enabled devices; where the first and the second BAN enabled devices are paired for authorising the user by the second BAN enabled device; the payment counter 30 comprises:
 a) a detector unit 32 configured for detecting the presence of the user's body;
 b) a radio communication interface 33 configured to communicate with the first and/or second BAN enabled devices;
 c) a processing circuitry 34 configured for:
 d) establishing a connection between the payment counter and the first BAN enabled device;
 e) sending a request for payment from the payment counter to the first and/or second BAN enabled device; and
 f) receiving a confirmation of the requested payment from the first and/or second BAN enabled device.

The detector unit 32, the radio communication unit 33 and the processing circuitry 34 may be arranged in a unit or chip 31. The payment counter may further comprise a display 35 for displaying information to the user, such as payment information.

Figure 5:
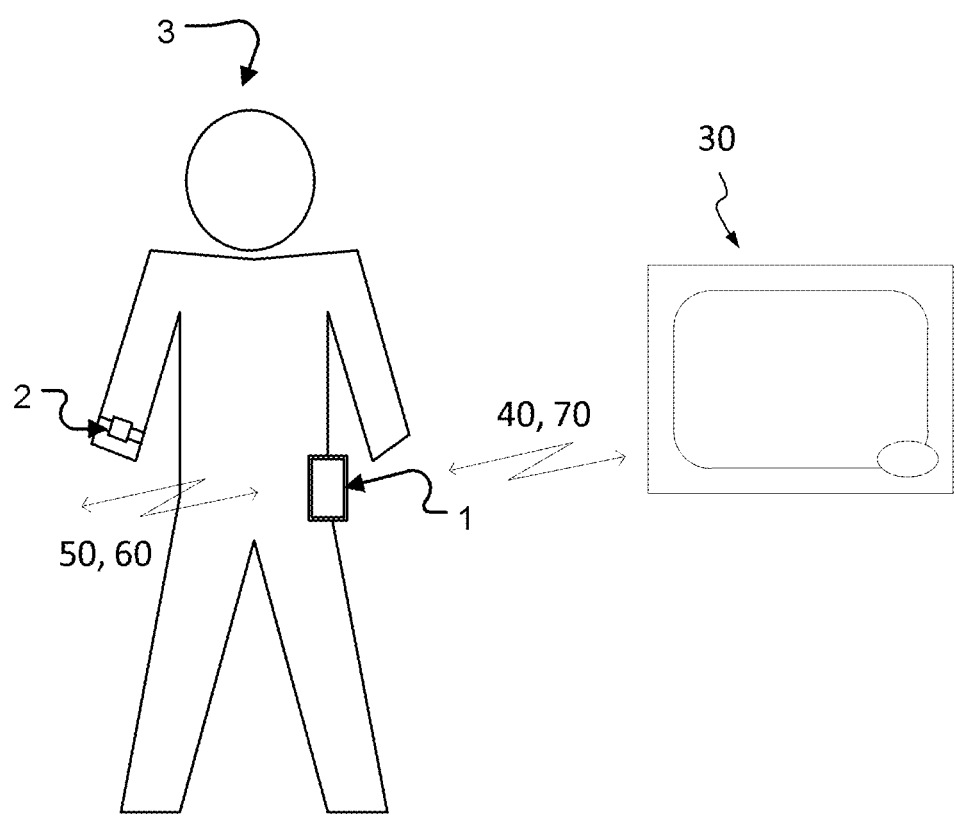
FIG. 5 shows an example of a system and a method performed in a system comprising a first Body Area Network (BAN) enabled device and a second BAN enabled device, for performing secure payment at a payment counter.

FIG. 5 shows an example of a system and a method performed in a system comprising a first Body Area Network (BAN) enabled device 1 and a second BAN enabled device 2, for performing secure payment at a payment counter 30 by a user 3 of the first 1 and the second BAN enabled devices 2, the user 3 wearing or carrying the first 1 and the second BAN enabled devices 2; where the first 1 and the second BAN enabled devices 2 are paired for authorising the user 3 by the second BAN enabled device 2; the method comprises:
 a) establishing a connection 40 between the payment counter 30 and the first BAN enabled device 1;
 b) sending a BAN signal 50 via BAN from the first BAN enabled device 1 to the second BAN enabled device 2 requiring confirmation from the second BAN enabled device 2 that the second BAN enabled device 2 is in contact with the user's 3 body;
 c) receiving a confirmation BAN signal 60 via BAN from the second BAN enabled device 2 to the first BAN enabled device 1 confirming that the second BAN enabled device 2 is in contact with the user's 3 body;
 d) receiving a request 70 for payment from the payment counter 30 in the first 1 and/or second BAN enabled device 2; and
 e) confirming the requested payment in the first 1 and/or second BAN enabled device 2.

Figure 6A:
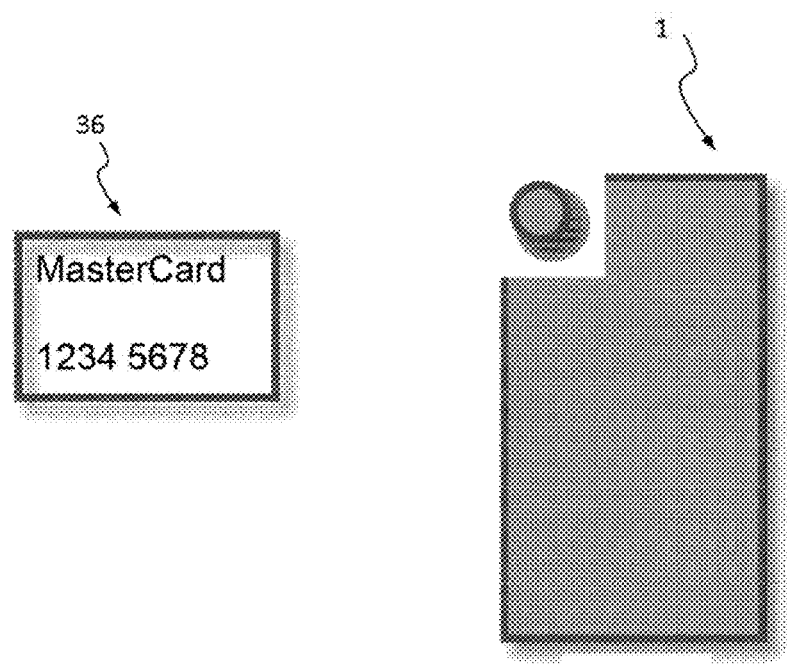
FIGS. 6A-E show an example of a system and a method performed in a system comprising a first Body Area Network (BAN) enabled device and a second BAN enabled device, for performing secure payment at a payment counter.

FIGS. 6A-E show an example of a system and a method performed in a system comprising a first Body Area Network (BAN) enabled device 1 and a second BAN enabled device 2, for performing secure payment at a payment counter 30 by a user 3 of the first 1 and the second BAN enabled devices 2, the user 3 wearing or carrying the first 1 and the second BAN enabled devices 2; where the first 1 and the second BAN enabled devices 2 are paired for authorising the user 3 by the second BAN enabled device 2. The method comprises:

FIG. 6A shows that the payment card 36 is scanned into the first BAN enabled device 1, being a phone.

Figure 6B:
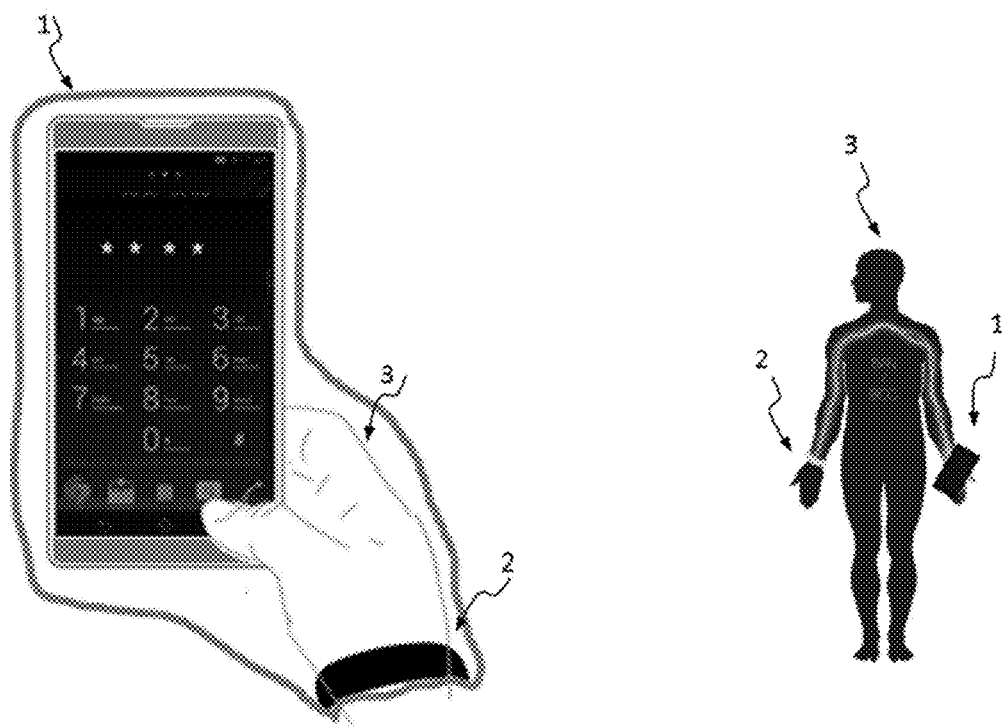

FIG. 6B shows that the user 3 puts on the second BAN enabled device 2, which is a BAN wristband. The second BAN enabled device 2 could alternatively be another BAN device, e.g. a pocket coin etc. The user 3 logs onto the phone 1, which sends a code to the wristband 2. This is done once only, when wristband 2 is put on. This code is only used between the wristband 2 and the phone 1. The wristband 2 and the phone 1 need to be on the same body of a user 3.

Figure 6C:
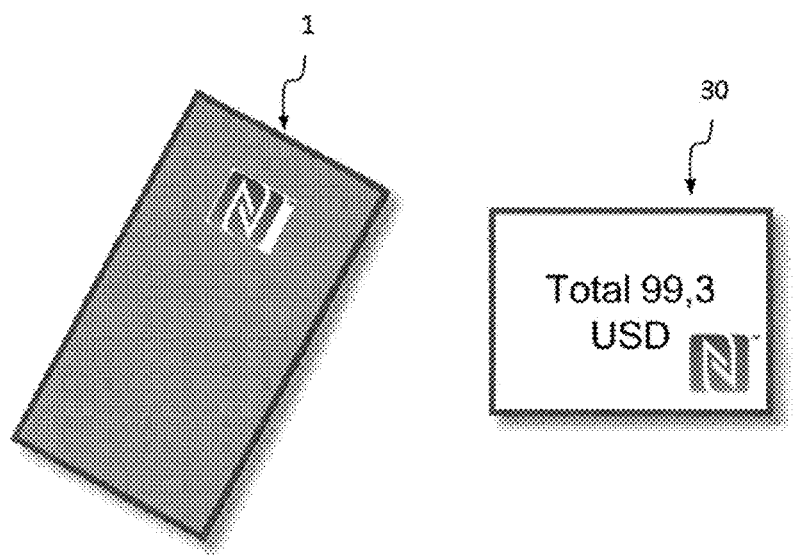

FIG. 6C shows that the user touches the payment counter 30 with the phone 1 thereby establishing a connection, e.g. NFC.

Figure 6D:
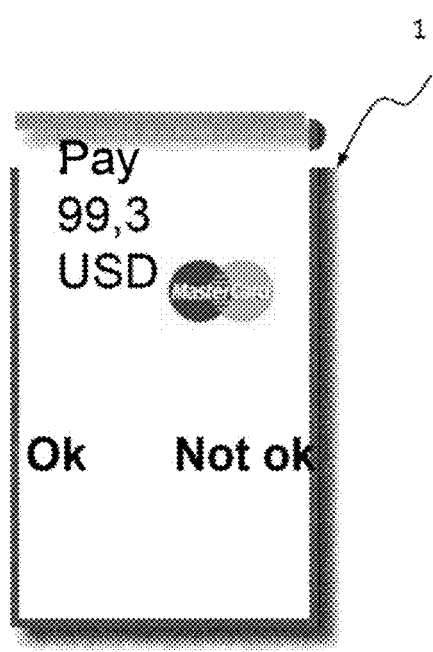

FIG. 6D shows that the phone 1 lights up with a payment suggestion.

Figure 6E:
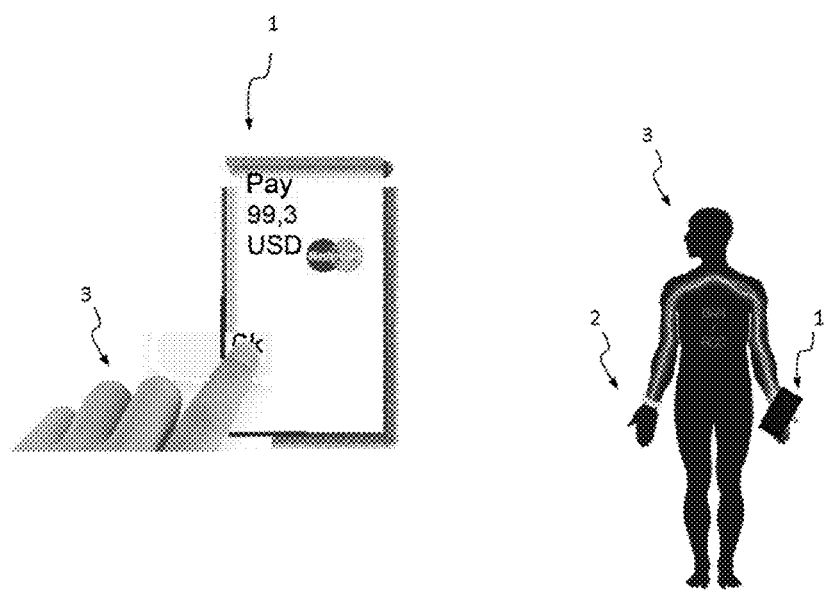

FIG. 6E shows that the user 3 approves the payment with putting his finger on an "OK" button on the phone 1. The phone 1 will send a signal to the wristband 2, and ask for the code. If the code is ok, the transaction is approved. The code stays in the wristband 2 as long as the wristband 2 stays on the body of the user 3.

Figure 7:
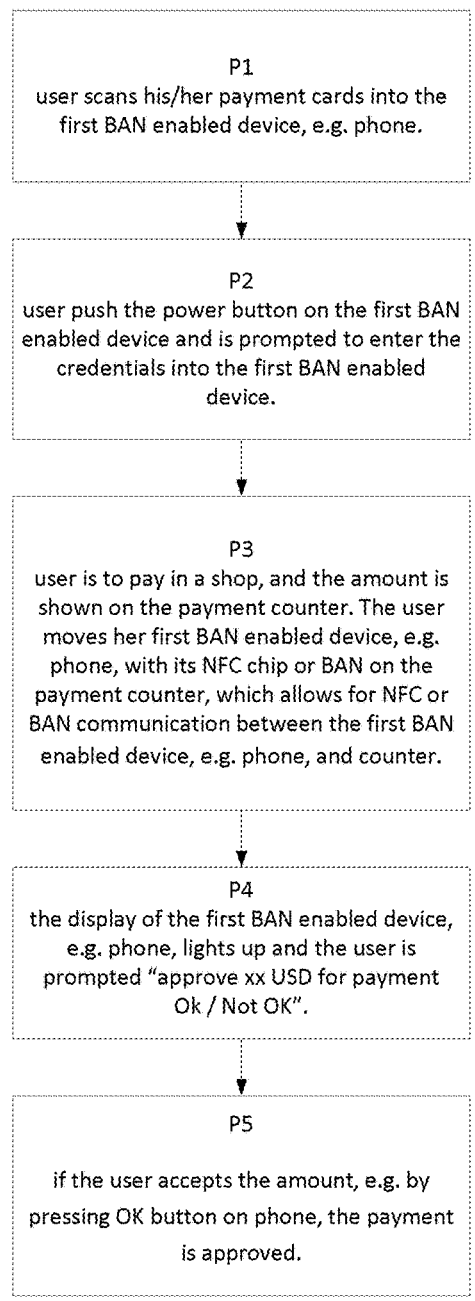
FIG. 7 shows a flow chart of a method according to present invention.

FIG. 7 shows a flow chart of a method according to present invention.

In P1 the user scans his/her payment cards into the first BAN enabled device, e.g. phone.

In P2 the user push the power button on the first BAN enabled device and is prompted to enter the credentials, e.g. pin code, digits, alpha numeric, graphical, biometrics, a combination of these, or something else, into the first BAN enabled device. Since this is typically only done once per day or less often, the credentials, e.g. pin, can be long.

If there is a second BAN enabled device, e.g. a wristband with BAN, on the body, the BAN signal sent from the first BAN enabled device, e.g. phone, will be received by the second BAN enabled device, e.g. wristband, and the second BAN enabled device will respond over BAN.

The user is prompted "do you want to use your wristband authorize you".

If the user approves, the wristband is later used for opening the phone when the user push the power button, and for payment.

The phone will send a, typically long, randomly generated code to the wristband via BAN.

Authorization for payment might be done by starting a separate app and entering a separate pin code.

In P3 the user is to pay the cashier in a shop, and the amount is shown on the payment or checkout counter. The user moves her first BAN enabled device, e.g. phone, with its NFC chip or BAN on the payment counter, which allows for NFC or BAN communication between the first BAN enabled device, e.g. phone, and counter.

The first BAN enabled device, e.g. phone, checks if there is a second BAN enabled device, e.g. wristband, on the body by sending a BAN signal, and if there is, the wristband will respond with the credentials, e.g. code. If the credentials, e.g. code, is the same as previously sent from phone to the wristband, the wristband has authorized the phone for payment.

In P4 the display of the first BAN enabled device, e.g. phone, lights up and the user is prompted something like "approve xx USD for payment Ok/Not OK".

At this stage, if there was no wristband on the arm or if the credentials, e.g. code, that was received from the wristband was wrong, there could be an option to show "enter your pin for payment" on the phone.

This would provide the same level of security as using the second BAN enabled device, e.g. wristband for authorization, except that someone else could be looking at the display when the code is entered by the user. Furthermore, if it is a longer code it is inconvenient to enter it every time.

The order of the processes or steps above can be reversed as it does not matter when the first BAN enabled device, e.g. phone, ask the second BAN enabled device, e.g. wristband, over BAN for the code, i.e. if it is before the payment suggestion is shown on the display of the phone, or if it after the payment suggestion has been shown on the display of the phone.

In P5 if the user accepts the amount, e.g. by pressing OK button on phone, the payment is approved.

There is no difference of information exchange between phone and checkout counter in the prior art Apple Pay and in the present solution with BAN.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

Items

Item 1. A method performed in a system comprising a first Body Area Network (BAN) enabled device and a second BAN enabled device, for performing secure payment at a payment counter by a user of the first and the second BAN enabled devices, the user wearing or carrying the first and the second BAN enabled devices; where the first and the second BAN enabled devices are paired for authorising the user by the second BAN enabled device; the method comprises:
  a) establishing a connection between the payment counter and the first BAN enabled device;
  b) sending a BAN signal via BAN from the first BAN enabled device to the second BAN enabled device requiring confirmation from the second BAN enabled device that the second BAN enabled device is in contact with the user's body;
  c) receiving a confirmation BAN signal via BAN from the second BAN enabled device to the first BAN enabled device confirming that the second BAN enabled device is in contact with the user's body;
  d) receiving a request for payment from the payment counter in the first and/or second BAN enabled device; and
  e) confirming the requested payment in the first and/or second BAN enabled device.

Item 2. The method according to any of the preceding items, wherein the first and the second BAN enabled devices are paired by using BAN, and where the pairing performed in the first BAN enabled device comprises:
  a) detecting that the second BAN enabled device is proximate the first BAN enabled device;
  b) determining whether both the first BAN enabled device and the second BAN enabled device are in contact with the user's body; and
  c) pairing with the second BAN enabled device using a BAN if both the first BAN enabled device and the second BAN enabled device are in contact with the user's body.

Item 3. The method according to any of the preceding items, wherein the pairing comprises storing a first credential onto the second BAN enabled device from the first BAN enabled device.

Item 4. The method according to any of the preceding items, wherein authorising the user by the second BAN enabled device comprises unlocking the first BAN enabled device with the second BAN enabled device using a BAN, and where the authorisation performed at the first BAN enabled device comprising:
  a) establishing a BAN link/connection with the second BAN enabled device in contact with the user's body responsive to the user actuating a user control on the first BAN enabled device, wherein the BAN link/connection uses the user's body as a transmission medium;
  b) authenticating the second BAN enabled device over the BAN link/connection using the first credential; and
  c) unlocking the first BAN enabled device for the user if the authentication is successful.

Item 5. The method according to any of the preceding items, wherein authorising the user by the second BAN enabled device to perform secure payment comprises the user entering a second credential in a respective software program on the first BAN enabled device.

Item 6. The method according to the preceding item, wherein the first credential and the second credential are the same credentials or different credentials.

Item 7. The method according to any of items 5-6, wherein the method comprises scrapping the first credential and/or the second credential from the second BAN enabled device, when the second BAN enabled device is removed from user's body.

Item 8. The method according to any of the preceding items, wherein the method comprises:
  a) if a confirmation BAN signal via BAN from the second BAN enabled device is not received in the first BAN enabled device,
  b) approving/confirming the requested payment on the first BAN enabled device comprises the user entering a third credential.

Item 9. The method according to any of the preceding items, wherein establishing a connection between the payment counter and the first BAN enabled device comprises using a near-field communication (NFC) means in the payment counter and in the first BAN enabled device.

Item 10. The method according to any of the preceding items, wherein establishing a connection between the payment counter and the first BAN enabled device comprises using a BAN connection in the payment counter and in the first BAN enabled device.

Item 11. The method according to any of the preceding items, wherein approving/confirming the requested payment in the first and/or second BAN enabled device comprises the user pressing/touching a key on a screen on the first and/or second BAN enabled device.

Item 12. The method according to any of the preceding items, wherein the method comprises providing payment card details to the first BAN enabled device.

Item 13. The method according to preceding item, wherein providing payment card details to the first BAN enabled device comprises scanning the payment card with the first BAN enabled device.

Item 14. The method according to any of the preceding items, wherein the method comprises using biometrics, such as pulse, electrocardiogram (EKG or ECG), impedance and/or tremor, of the user to confirm the user.

Item 15. A system comprising a first Body Area Network (BAN) enabled device and a second BAN enabled device, for performing secure payment at a payment counter by a user of the first and the second BAN enabled devices, the user wearing or carrying the first and the second BAN enabled devices; where the first and the second BAN enabled devices are paired for authorising the user by the second BAN enabled device; the system comprises:
  a) a detector unit configured for detecting the presence of the user's body;
  b) a radio communication interface configured to communicate with the first and/or second BAN enabled devices;
  c) a processing circuitry configured for:
  d) establishing a connection between the payment counter and the first BAN enabled device;
  e) sending a BAN signal via BAN from the first BAN enabled device to the second BAN enabled device requiring/asking confirmation from the second BAN enabled device that the second BAN enabled device is in contact with the user's body;
  f) receiving a confirmation BAN signal via BAN from the second BAN enabled device to the first BAN enabled device confirming that the second BAN enabled device is in contact with the user's body;
  g) receiving a request for payment from the payment counter in the first and/or second BAN enabled device;
  h) approving/confirming the requested payment in the first and/or second BAN enabled device.

Item 16. A method performed in a first Body Area Network (BAN) enabled device for performing secure payment at a payment counter by a user of the first BAN enabled device, the user wearing or carrying the first BAN enabled device and a second BAN enabled device; where the first and the second BAN enabled devices are paired for authorising the user by the second BAN enabled device; the method comprises:
  a) establishing a connection between the payment counter and the first BAN enabled device;
  b) sending a BAN signal via BAN from the first BAN enabled device to the second BAN enabled device requiring confirmation from the second BAN enabled device that the second BAN enabled device is in contact with the user's body;
  c) receiving a confirmation BAN signal via BAN from the second BAN enabled device to the first BAN enabled device confirming that the second BAN enabled device is in contact with the user's body;
  d) receiving a request for payment from the payment counter in the first BAN enabled device;
  e) confirming the requested payment in the first BAN enabled device.

Item 17. A method performed in a second Body Area Network (BAN) enabled device for performing secure payment at a payment counter by a user of the second BAN enabled device, the user wearing or carrying the second BAN enabled device and a first BAN enabled device; where the first and the second BAN enabled devices are paired for authorising the user by the second BAN enabled device; the method comprises:
  a) receiving a request from the first BAN enabled device in the second BAN enabled device to confirm that the second BAN enabled device is in contact with the user's body, upon establishment of a connection between the payment counter and the first BAN enabled device;
  b) sending a confirmation BAN signal via BAN from the second BAN enabled device to the first BAN enabled device confirming that the second BAN enabled device is in contact with the user's body;
  c) receiving a request for payment from the payment counter in the second BAN enabled device;
  d) confirming the requested payment in the second BAN enabled device.

The invention claimed is:

1. A method for performing secure payment at a payment counter, the method comprising:
  detecting, by a first Body Area Network (BAN) enabled device, a user login to the first BAN enabled device;
  sending, by the first BAN enabled device, a first credential to a second BAN enabled device based on the detected login;
  storing, by the first BAN enabled device, the first credential on the second BAN enabled device;
  establishing, by the first BAN enabled device, a connection between the payment counter and the first BAN enabled device;

requesting, by the first BAN enabled device, confirmation from the second BAN enabled device that the second BAN enabled device is in contact with the user's body, by sending a BAN signal via BAN to the second BAN enabled device;

receiving, by the first BAN enabled device, a confirmation BAN signal via BAN from the second BAN enabled device confirming that the second BAN enabled device is in contact with the user's body;

establishing, by the first BAN enabled device, a BAN connection between the first BAN enabled device and the second BAN enabled device based on receiving the confirmation BAN signal confirming that the second BAN enabled device is in contact with the user's body, wherein establishing the BAN connection further comprises using the user's body as a transmission medium;

receiving, by the first BAN enabled device, the first credential from the second BAN enabled device;

authenticating, by the first BAN enabled device, the user based on the first BAN enabled device receiving the first credential from the second BAN enabled device;

unlocking, by the first BAN enabled device, the first BAN enabled device for the user based on authenticating the user;

receiving, by the first BAN enabled device, a request for payment from the payment counter; and confirming, by the first BAN enabled device, the requested payment.

2. The method according to claim 1, wherein the first and the second BAN enabled devices are paired by using BAN, and where the pairing performed in the first BAN enabled device comprises:

detecting that the second BAN enabled device is proximate the first BAN enabled device;

determining that both the first BAN enabled device and the second BAN enabled device are in contact with the user's body; and pairing with the second BAN enabled device using a BAN based on the determination that both the first BAN enabled device and the second BAN enabled device are in contact with the user's body.

3. The method according to claim 1, further comprising authorizing the user by the second BAN enabled device, wherein authorizing the user further comprises receiving, by a respective software program on the first BAN enabled device, a second credential from the user.

4. The method according to claim 3, wherein the first credential and the second credential are the same credentials or different credentials.

5. The method according to claim 3, wherein the method comprises scrapping at least one of the first credential or the second credential from the second BAN enabled device based on the second BAN enabled device being removed from the user's body.

6. The method according to claim 1, wherein establishing a connection between the payment counter and the first BAN enabled device comprises using a nearfield communication (NFC) means in the payment counter and in the first BAN enabled device.

7. The method according to claim 1, wherein establishing a connection between the payment counter and the first BAN enabled device comprises using a BAN connection in the payment counter and in the first BAN enabled device.

8. The method according to claim 1, wherein confirming the requested payment in the at least one of the first or the second BAN enabled device comprises the user pressing a key on a screen on the at least one of the first or the second BAN enabled device.

9. The method according to claim 1, wherein the method comprises providing payment card details to the first BAN enabled device.

10. The method according to claim 9, wherein providing payment card details to the first BAN enabled device comprises scanning the payment card with the first BAN enabled device.

11. The method according to claim 1, wherein the method further comprises confirming an identity of the user using biometric information comprising at least one of pulse, electrocardiogram (EKG or ECG), impedance or tremor, of the user.

12. A method for performing secure payment at a payment counter comprising:

detecting, by a first Body Area Network (BAN) enabled device, a user login to the first BAN enabled device;

sending, by the first BAN enabled device, a first credential to a second BAN enabled device based on the detected login;

establishing, by the first BAN enabled device, a connection between the payment counter and the first BAN enabled device;

requesting, by the first BAN enabled device, confirmation from the second BAN enabled device that the second BAN enabled device is in contact with the user's body, by sending a BAN signal via BAN to the second BAN enabled device;

receiving, by the first BAN enabled device, a confirmation BAN signal via BAN from the second BAN enabled device confirming that the second BAN enabled device is in contact with the user's body;

establishing, by the first BAN enabled device, a BAN connection between the first BAN enabled device and the second BAN enabled device based on receiving the confirmation BAN signal confirming that the second BAN enabled device is in contact with the user's body, wherein establishing the BAN connection further comprises using the user's body as a transmission medium;

receiving, by the first BAN enabled device, the first credential from the second BAN enabled device;

authenticating, by the first BAN enabled device, the user based on the first BAN enabled device receiving the first credential from the second BAN enabled device;

unlocking, by the first BAN enabled device, the first BAN enabled device for the user based on authenticating the user;

receiving, by the second BAN enabled device, a request for payment from the payment counter; and confirming, by the second BAN enabled device, the requested payment.

* * * * *